US012802992B2

(12) United States Patent
Li et al.

(10) Patent No.: US 12,802,992 B2
(45) Date of Patent: Nov. 17, 2026

(54) BINDER, ELECTROCHEMICAL APPARATUS USING SAID BINDER, AND ELECTRONIC DEVICE

(71) Applicant: Ningde Amperex Technology Limited, Ningde City (CN)

(72) Inventors: Jiawen Li, Ningde City (CN); Changchuan Shi, Ningde City (CN); Qingwen Zhang, Ningde City (CN)

(73) Assignee: Ningde Amperex Technology Limited, Ningde City (CN)

( * ) Notice: Subject to any disclaimer, the term of this patent is extended or adjusted under 35 U.S.C. 154(b) by 635 days.

(21) Appl. No.: 18/355,954

(22) Filed: Jul. 20, 2023

(65) Prior Publication Data

US 2024/0030444 A1 Jan. 25, 2024

Related U.S. Application Data

(63) Continuation of application No. PCT/CN2021/073006, filed on Jan. 21, 2021.

(51) Int. Cl.

| | |
|---|---|
| ***H01M 4/62*** | (2006.01) |
| ***C08F 212/08*** | (2006.01) |
| ***H01M 4/13*** | (2010.01) |

(52) U.S. Cl.

CPC .......... *H01M 4/622* (2013.01); *C08F 212/08* (2013.01); *H01M 4/13* (2013.01)

(58) Field of Classification Search

CPC ........ H01M 4/13; H01M 4/622; C08F 212/08

See application file for complete search history.

(56) References Cited

U.S. PATENT DOCUMENTS

| | | | | |
|---|---|---|---|---|
| 2012/0330589 | A1* | 12/2012 | Ryu | H01M 10/056 702/63 |
| 2018/0342765 | A1* | 11/2018 | Mimura | H01M 10/0585 |

FOREIGN PATENT DOCUMENTS

| | | | |
|---|---|---|---|
| CN | 101156264 | A | 4/2008 |
| CN | 101248133 | A | 8/2008 |
| CN | 102803416 | B | 1/2016 |
| CN | 108496273 | A | 9/2018 |
| CN | 110982008 | A | 4/2020 |

OTHER PUBLICATIONS

International Search Report dated Oct. 9, 2021 for Application No. PCT/CN2021/073006.

First Chinese office action dated Apr. 22, 2022 for Application No. CN 202180003058.X.

* cited by examiner

*Primary Examiner* — Karie O'Neill Apicella

(74) *Attorney, Agent, or Firm* — Maier & Maier, PLLC

(57) ABSTRACT

A binder includes a polymer, the polymer is obtained by polymerizing a first monomer, a second monomer, a third monomer, and a fourth monomer, where the first monomer, the second monomer, and the third monomer are each independently selected from aromatic alkenyl compounds, ethylenically unsaturated carboxylic acids, ethylenically unsaturated carboxylic acid salts, or ethylenically unsaturated carboxylates, and the fourth monomer is selected from a substituted or unsubstituted cyclic compound having at least one double bond. The addition of the fourth monomer in this application can enhance the tensile strength and adhesive strength of the binder, suppress the volume expansion of electrode plates, and enable the formation of a networked structure in the polymer, improving the electrolyte resistance performance and consequently increasing the cycle life of batteries.

18 Claims, No Drawings

BINDER, ELECTROCHEMICAL APPARATUS USING SAID BINDER, AND ELECTRONIC DEVICE

CROSS REFERENCE TO THE RELATED APPLICATIONS

This application is a continuation under 35 U.S.C. § 120 of international patent application PCT/CN2021/073006 filed on Jan. 21, 2021, the entire content of which is incorporated herein by reference.

TECHNICAL FIELD

This application relates to the field of energy storage material technologies, and specifically, to a binder and an electrochemical apparatus and electronic device using such binder.

BACKGROUND

Electrochemical apparatuses, such as lithium-ion batteries, have been widely used in fields such as mobile phones, computers, electric bicycles, and electric vehicles due to their advantages such as high energy density, long cycle life, no memory effect, low self-discharge, and environmental friendliness. In recent years, with the development of mobile electronic technology and the increasing demand for mobile electronic apparatuses, increasingly high requirements have been imposed on performance of lithium-ion batteries, particularly in terms of energy density and cycling performance of lithium-ion batteries.

During the use of a lithium-ion battery, as the charge-discharge cycling proceeds, positive and negative electrode plates undergo repeated intercalation and deintercalation of lithium ions, resulting in volume expansion of the positive and negative electrode plates. The volume expansion of the negative electrode is particularly significant and affects the performance of the lithium-ion battery. The negative electrode plate includes a negative electrode active material (such as graphite or a silicon-based material) and a binder. The volume expansion and contraction of the negative electrode active material is severe. The volume expansion and contraction of the active material during the cycling can easily cause separation of a negative electrode active material layer close to a current collector surface layer from the current collector surface, leading to detachment of the negative electrode active material layer off the electrode plate. This not only reduces the adhesion performance of the negative electrode binder but also enlarges the distance between the negative electrode active material particles, thereby destroying the original bonding structure of the negative electrode and resulting in increased battery thickness and deterioration of cycling performance. To suppress the expansion of the negative electrode plate, structure design and improvement can be made on the binder to suppress expansion. However, existing binders such as polyvinylidene fluoride and carboxymethyl cellulose cannot effectively suppress the expansion of the negative electrode plate.

Furthermore, binders available for the negative electrode include styrene-butadiene rubber (SBR). Conventional SBR binders are generally obtained by polymerization of styrene and butadiene. However, available conventional SBR binders, as a type of flexible polymer rubber, exhibit relatively low adhesion strength and intrinsic strength when used as negative electrode binders for lithium-ion batteries, and cannot effectively suppress the volume expansion caused by the intercalation of lithium ions into the negative electrode material during a number of charge-discharge cycles of the batteries. In addition, there is a relatively large difference in the affinity between an SBR binder and a battery electrolyte, preventing the polar electrolyte from penetrating into active material particles of the electrode. This leads to an increase in the electrode interface resistance, resulting in relatively large expansion of the lithium-ion batteries during the cycling and a shorter battery cycle life.

Therefore, a very important research direction, as well as an urgent market demand, is to provide a binder with strong adhesion and capable of effectively suppressing the expansion of electrode plates, thereby improving the cycling performance of lithium-ion batteries.

SUMMARY

A primary objective of this application is to propose a binder.

A second objective of this application is to propose an electrochemical apparatus and an electronic device using such binder.

In order to achieve the objectives of this application, a technical solution employed is as follows.

This application relates to a binder including a polymer, the polymer being obtained by polymerizing a first monomer, a second monomer, a third monomer, and a fourth monomer.

The first monomer, the second monomer, and the third monomer are each independently selected from aromatic alkenyl compounds, ethylenically unsaturated carboxylic acids, ethylenically unsaturated carboxylic acid salts, or ethylenically unsaturated carboxylates, and the first monomer, the second monomer, and the third monomer are different from each other.

The fourth monomer includes a substituted or unsubstituted cyclic compound having at least one double bond.

Preferably, the fourth monomer includes a substituted or unsubstituted cyclic compound having at least two double bonds.

Preferably, the cyclic compound having at least two double bonds includes a cyclic diene; or at least one aromatic ring-containing diene and at least one non-aromatic cyclic diene; or at least one non-aromatic monocyclic diene and at least one non-aromatic polycyclic diene.

Preferably, the fourth monomer includes a substituted or unsubstituted cyclic olefin, and the number of carbon atoms in the substituted or unsubstituted cyclic olefin is 5 to 30, preferably 5 to 20, further preferably 5 to 12, and further preferably 5 to 8.

Preferably, the fourth monomer includes at least one of cyclopentadiene, alkylcyclopentadiene, cyclohexadiene, alkylcyclohexadiene, cycloheptadiene, alkylcycloheptadiene, cyclooctadiene, or alkylcyclooctadiene. More preferably, the fourth monomer includes at least one of cyclopentadiene, alkylcyclopentadiene, cyclohexadiene, or alkylcyclohexadiene.

The alkyl groups in alkylcyclopentadiene, alkylcyclohexadiene, alkylcycloheptadiene, and alkylcyclooctadiene each independently include an alkyl group with 1-12 carbon atoms, preferably an alkyl group with 1-6 carbon atoms, and more preferably an alkyl group with 1-3 carbon atoms.

The alkyl groups in alkylcyclopentadiene, alkylcyclohexadiene, alkylcycloheptadiene, and alkylcyclooctadiene each independently include an alkyl group substituted with one or more heteroatoms or with one or more groups containing heteroatoms.

Preferably, the fourth monomer includes at least one of cyclopentadiene, methylcyclopentadiene, ethylcyclopentadiene, propykcyclopentadiene, cyclohexadiene, methylcyclohexadiene, or ethylcyclohexadiene. More preferably, the fourth monomer includes at least one of cyclopentadiene, methylcyclopentadiene, or cyclohexadiene.

The cyclohexadiene includes 1,3-cyclohexadiene or 1,4-cyclohexadiene and preferably is 1,3-cyclohexadiene.

Preferably, the first monomer includes an aromatic alkenyl compound, the second monomer includes an ethylenically unsaturated carboxylic acid or an ethylenically unsaturated carboxylic acid salt, and the third monomer includes an ethylenically unsaturated carboxylate.

Preferably, the aromatic alkenyl compound includes an aromatic vinyl compound.

Preferably, the aromatic alkenyl compound includes at least one of styrene, α-methylstyrene, divinylbenzene, tert-butylstyrene, meta-methylstyrene, para-ethylstyrene, 1,1-diphenylethylene, vinyl naphthalene, vinyl anthracene, or vinyl pyridine. More preferably, the aromatic alkenyl compound includes at least one of styrene, α-methylstyrene, or divinylbenzene.

Preferably, the ethylenically unsaturated carboxylic acid or ethylenically unsaturated carboxylic acid salt includes at least one of acrylic acid, methacrylic acid, lithium acrylic acid, potassium acrylic acid, sodium acrylic acid, lithium methacrylic acid, potassium methacrylic acid, or sodium methacrylic acid.

Preferably, the ethylenically unsaturated carboxylate includes an alkyl acrylate or an alkyl methacrylate. More preferably, the ethylenically unsaturated carboxylate includes alkyl acrylates with 1-10 carbon atoms (C1 to C10 alkyl) or alkyl methacrylates with 1-10 carbon atoms (C1 to C10 alkyl).

Preferably, the ethylenically unsaturated carboxylate includes at least one of methyl acrylate, ethyl acrylate, isopropyl acrylate, n-butyl acrylate, hexyl acrylate, heptyl acrylate, 2-ethylhexyl acrylate, lauryl acrylate, methyl methactylate, ethyl methacrylate, propyl methacrylate, isobutyl methacrylate, or 2-ethylhexyl methacrylate.

Preferably, a mass percentage of the fourth monomer in the polymer is 0.5% to 10%, preferably 0.5% to 8%, and further preferably 1% to 8%.

Preferably, a mass percentage of the first monomer in the polymer is 5% to 45%, preferably 10% to 45%.

A mass percentage of the third monomer in the polymer is 5% to 44.5%, preferably 10% to 44.5%.

A mass percentage of the second monomer in the polymer is 0.5% to 89.5%, preferably 1.5% to 79.5%.

The binder polymer structure in this application is simple, and those skilled in the art can easily prepare the binder according to the structure of the binder. The preparation process of the binder is simple, easy to control, highly feasible, has minimal environmental pollution, and is suitable for large-scale industrial production.

Specifically, the binder of this application can be prepared by the following method:

One portion of an emulsifier is mixed with a first monomer, a second monomer, and a third monomer at a specific ratio and rapidly emulsified in a specified amount of water to obtain a pre-emulsion. Then, an initiator and another portion of the emulsifier are mixed with and dissolved well in a specified amount of water, and a resulting mixture is added to a first dropper, resulting in an initiator emulsion. Approximately one-third of the pre-emulsion obtained is poured into a reactor, heated and stirred, and the remaining approximately two-thirds of the pre-emulsion are added to a second dropper. When the temperature reaches 60 °C to 80 °C, the initiator emulsion from the first dropper is slowly added to the reactor, and simultaneously, the fourth monomer is added dropwise using a third dropper; and with the temperature controlled at approximately 80 °C, the pre-emulsion from the second dropper is slowly added, the solid content of the emulsion is maintained at about 50% (blueing state), and the temperature is maintained for 0.5 hours to 4 hours. After reactions are completed, the temperature is lowered to room temperature, and the pH value is adjusted to approximately between 7 and 8 to obtain the binder.

Optionally, the emulsifier can be, for example, high-level fatty alcohol polyoxyethylene ether, alkylphenol polyoxyethylene ether, a carboxylic acid salt such as potassium laurate, a sulfate ester salt such as sodium dodecyl sulfate, a sulfonic acid salt such as sodium bis(2-ethylhexyl) sulfosuccinate, or the like. In the process of preparing the binder, a mass of the one portion of the emulsifier added is 0.05% to 10% of a total mass of the first monomer, the second monomer, the third monomer, and the fourth monomer, preferably 0.1% to 8%.

Optionally, a mass ratio of the one portion of the emulsifier to the another portion of the emulsifier is 2:1 to 6:1, preferably 3:1 to 5:1.

Optionally, the initiator can be, for example, azobisisobutyronitrile, azobisisoheptylnitrile, azobiscyclohexylcarbonitrile, benzoyl peroxide, tert-butyl hydroperoxide, ammonium persulfate, potassium persulfate, azobisisobutylamidine hydrochloride (V-50 initiator), azobisisobutylimidazoline hydrochloride (VA-044 initiator), azobisisobutylimidazoline (VA061 initiator), or the like. In the process of preparing the binder, a mass of the initiator added is 0.01% to 1% of the total mass of the first monomer, the second monomer, the third monomer, and the fourth monomer, preferably 0.05% to 0.6%.

For the binder prepared by using the foregoing solvent system or monomer system and the preferred emulsifiers and initiator within the specified proportion ranges and under the preferred polymerization reaction atmosphere, temperature, and time, the types and proportions of emulsifiers and initiator are appropriate, the reaction conditions are mild, and the resulting binder exhibits excellent stability and adhesive performance.

The binder of this application can be used as a binder for electrochemical apparatuses, such as in positive electrodes, negative electrodes, or separators of secondary batteries. The binder of this application is particularly preferable as a binder for the negative electrode of the secondary battery because the problems caused by the binding of the negative electrode in the secondary battery are more significant.

Therefore, this application further relates to an electrochemical apparatus including a positive electrode, a negative electrode, an electrolyte, and a separator, where at least one of the positive electrode, the negative electrode, and the separator includes the binder of this application.

Preferably, the negative electrode includes the binder of this application. The negative electrode includes a negative electrode current collector and a negative electrode active substance layer, and the negative electrode active substance layer includes a negative electrode active substance, a conductive agent, and the binder of this application. Preferably, a mass percentage of the binder in the negative electrode active substance layer is 0.5% to 8%, preferably 1% to 4%.

Preferably, the negative electrode active substance is not limited, and includes at least one of a graphite-based material or a silicon-based material.

Preferably, the conductive agent is not limited, and includes at least one of conductive carbon black, carbon fiber, graphene, Ketjen black, single-walled carbon nanotubes, or multi-walled carbon nanotubes.

Methods for preparing negative electrodes using a binder are well known to those skilled in the art. Optionally, a method for preparing negative electrode plates using the binder of this application is as follows: The binder of this application, a conductive agent, and a negative electrode active substance are mixed in deionized water, and a resulting slurry is applied onto a negative electrode current collector to prepare a negative electrode plate.

This application further relates to an electronic device including the foregoing electrochemical apparatus.

The technical solution of this application has at least the following beneficial effects:

In the binder and the electrochemical apparatus and electronic device using such binder provided in this application, the addition of the fourth monomer into the binder can result in increased rigidity of the cross-linked polymer, and a relatively large steric hindrance makes it difficult for molecular chains to slide, thereby improving the tensile strength and adhesive strength, so that the expansion problem of electrode plates during battery cycling can be effectively alleviated. Furthermore, the addition of the fourth monomer in the binder makes the polymer have a particular networked structure and excellent electrolyte resistance performance and helps to enhance physical properties of the adhesive film.

The binder provided in this application is particularly suitable for the preparation of electrode plates in electrochemical apparatuses and can improve the adhesive strength and electrolyte resistance performance of the electrode plates. Specifically, when used for the preparation of negative electrode plates, under the premise of ensuring the electrical performance of electrochemical apparatuses such as secondary batteries, the binder of this application significantly reduces the irreversible expansion of the negative electrode plates during the preparation of secondary batteries, improves the electrolyte resistance performance, reduces the irreversible expansion during cycling, and improves battery cycle life. Additional aspects and advantages of the embodiments of this application are partly described and presented in subsequent descriptions, or explained by implementation of the embodiments of this application.

This application is further described with reference to specific examples. It should be understood that these examples are merely used to describe this application but not to limit the scope of this application. The formulations, ratios, and the like in the embodiments can be changed according to actual requirements without substantially affecting the results.

DETAILED DESCRIPTION

The binder, electrochemical apparatus, and electronic device according to this application will be described in detail below.

Binder

According to a first aspect of this application, this application relates to a binder including a polymer. The polymer is obtained by polymerizing a first monomer, a second monomer, a third monomer, and a fourth monomer, where the first monomer, the second monomer, and the third monomer are each independently selected from aromatic alkenyl compounds, ethylenically unsaturated carboxylic acids, ethylenically unsaturated carboxylic acid salts, or ethylenically unsaturated carboxylates, and the first monomer, the second monomer, and the third monomer are different from each other; and the fourth monomer is selected from a substituted or unsubstituted cyclic compound having at least one double bond. The binder can effectively suppress expansion of electrode plates and improve the cycling performance of batteries.

The foregoing binder contains a copolymer obtained by copolymerization of mainly the first monomer, the second monomer, the third monomer, and the fourth monomer, where especially the fourth monomer is selected from substituted or unsubstituted cyclic compounds having at least one double bond. Through proper structural design, the copolymer structure with at least four functional groups mentioned above has a particular networked structure, which can alleviate the problems of low adhesion and processing difficulties in existing polymer structures, thereby improving the cycling and storage life of the batteries. In particular, during the synthesis of the binder, along with azo or organic peroxide compounds of initiators, a cyclic compound having at least one double bond is also added. The addition of the fourth monomer can result in an increased rigidity of the cross-linked polymer, and a relatively large steric hindrance makes it difficult for molecular chains to slide, thereby improving the tensile strength and adhesive strength, so that the expansion problem of electrode plates during battery cycling can be effectively alleviated. Furthermore, the addition of the fourth monomer in the binder makes the polymer have a particular networked structure and excellent electrolyte resistance performance and helps to enhance physical properties of the adhesive film. Therefore, electrode plates and secondary batteries using such binder can significantly improve the cycle life of batteries.

The binder provided in this application contains a polymer. The dissolution of this polymer is only 1% when immersed in an electrolyte at 60°C for 7 days, exhibiting better electrolyte resistance performance and film aging resistance than conventional linear polymers, so that the cycle life of secondary batteries such as lithium-ion batteries can be significantly improved.

As an improvement to the binder of this application, the fourth monomer includes a substituted or unsubstituted cyclic compound having at least two double bonds. The cyclic compound can have one double bond, two double bonds, or more than two double bonds. Preferably, the cyclic compound has two double bonds, that is, the fourth monomer is preferably selected from substituted or unsubstituted cyclic dienes. The addition of the fourth monomer containing a cyclic compound having two double bonds can result in an increased rigidity of the cross-linked polymer, and a relatively large steric hindrance makes it difficult for molecular chains to slide, thereby improving the tensile strength and adhesive strength. The addition of the fourth monomer containing a cyclic compound having two double bonds can also make the polymer have a particular networked structure and excellent electrolyte resistance performance and help to enhance physical properties of the adhesive film, so that the expansion problem of electrode plates during battery cycling is effectively alleviated, and the cycling performance of batteries is improved.

As used herein, the term "substituted or unsubstituted" means unsubstituted or substituted by one or more substituents selected from straight chain or branched chain alkyl, straight chain or branched chain alkylene, cycloalkyl, or alkoxy.

As used herein, the term "alkyl" has the meaning commonly understood in the an, which refers to a group formed after any carbon atom loses a hydrogen atom in a saturated hydrocarbon compound composed of only two elements, C and H. Alkyl groups include straight chain alkyl groups and branched chain alkyl groups. An alkyl group may be unsubstituted or substituted, but is preferably unsubstituted. When an alkyl group is substituted, the number of substituents can be 1 to 3, and each substituent can be, for example, independently selected from hydroxyl, halogen, nitro, cyano, amino, carboxyl, C1 to C6 alkyl. C1 to C6 alkoxy, or the like. Examples of alkyl described herein include but are not limited to methyl, ethyl, n-propyl, isopropyl, n-butyl, sec-butyl, isobutyl, tert-butyl, n-pentyl, n-hexyl, chloromethyl, fluoromethyl, trifluoromethyl, and 1,1,1-trifluoroethyl.

As used herein, the term "alkylene" refers to a divalent group obtained by removing two hydrogen atoms from a straight-chain or branched-chain saturated hydrocarbon, for example, methylene, 1,2-ethylene, 1, 3-propylene, 1,4-butylene, 1,5-pentylene, or 1,6-hexylene. Alkylene groups include straight chain alkylene groups and branched chain alkylene groups. An alkylene group may be unsubstituted or substituted, but is preferably unsubstituted. When an alkylene group is substituted, the number of substituents can be 1 to 3, and each substituent can be, for example, independently selected from hydroxyl, halogen, nitro, cyano, amino, carboxyl, C1 to C6 alkyl, C1 to C6 alkoxy, and the like.

As used herein, the term "alkoxy" refers to R—O—, where R is alkyl. An alkoxy group may be unsubstituted or substituted by 1 to 3 substituents, where each substituent can be, for example, independently selected from hydroxyl, halogen, nitro, cyano, amino, and carboxyl. Examples of alkoxy include but are not limited to methoxy, ethoxy, propoxy, butoxy, and 2-methoxyethoxy.

In this specification, any expression involving a value range of the number of carbon atoms, such as "the number of carbon atoms of 5 to 30" or "C1 to C10" that may be expressed as "$C_{5-30}$" or "$C_{1-10}$", refers to the enumeration of all positive integers within the specified upper and lower limits. For example, "$C_{1-10}$" refers to "$C_1$, $C_2$, $C_3$, $C_4$, $C_4$, $C_6$, $C_7$, $C_8$, $C_9$, and $C_{10}$". Similarly, any expression involving a value range of the number of substituents also refers to the enumeration of all positive integers within the specified upper and lower limits.

As an improvement to the binder of this application, the cyclic compound having at least two double bonds includes a cyclic diene; or at least one aromatic ring—containing diene and at least one non-aromatic cyclic diene; or at least one non-aromatic monocyclic diene and at least one non-aromatic polycyclic diene.

As an improvement to the binder of this application, the fourth monomer includes a substituted or unsubstituted cyclic olefin, preferably a substituted or unsubstituted cyclic diene. The number of carbon atoms in the substituted or unsubstituted cyclic diene is 5 to 30, preferably 5 to 20, further preferably 5 to 12, and further preferably 5 to 8. A cyclic diene with a suitable number of carbon atoms can effectively exert its rigidity, thereby improving the tensile strength and adhesive strength. An excessive number of carbon atoms will significantly increase the brittleness of the polymer, making the electrode plates prepared therefrom unfavorable for winding and battery preparation.

As an improvement to the binder of this application, the fourth monomer includes at least one of cyclopentadiene, alkylcyclopentadiene, cyclohexadiene, alkylcyclohexadiene, cycloheptadiene, alkylcycloheptadiene, cyclooctadiene, or alkylcyclooctadiene. More preferably, the fourth monomer includes at least one of cyclopentadiene, alkylcyclopentadiene, cyclohexadiene, or alkylcyclohexadiene.

The alkyl groups in alkylcyclopentadiene, alkylcyclohexadiene, alkylcycloheptadiene, and alkylcyclooctadiene each independently include an alkyl group with 1-12 carbon atoms, preferably an alkyl group with 1-6 carbon atoms, and more preferably an alkyl group with 1-3 carbon atoms.

The alkyl groups in alkylcyclopentadiene, alkylcyclohexadiene, alkylcycloheptadiene, and alkylcyclooctadiene each independently include an alkyl group substituted with one or more heteroatoms or with one or more groups containing heteroatoms.

Specific positions of the two double bonds in the foregoing cyclic dienes or the alkyl cyclic dienes are not particularly limited, and the bonding positions of the alkyl groups in the alkyl cyclic dienes are also not particularly limited.

Specifically, as an improvement to the binder of this application, the fourth monomer includes at least one of cyclopentadiene, methylcyclopentadiene, ethylcyclopentadiene, propylcyclopentadiene, cyclohexadiene, methylcyclohexadiene, or ethylcyclohexadiene. More preferably, the fourth monomer includes at least one of cyclopentadiene, methylcyclopentadiene, or cyclohexadiene. The cyclohexadiene includes 1,3-cyclohexadiene or 1,4-cyclohexadiene and preferably is 1,3-cyclohexadiene.

The cyclopentadiene, methylcyclopentadiene, and cyclohexadiene are respectively shown in the following formula 1, formula 2, and formula 3:

Formula 1

Formula 2

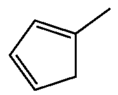

Formula 3

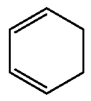

In the foregoing polymer, the foregoing cyclopentadiene, methylcyclopentadiene, or cyclohexadiene are used as the fourth monomer, and their raw materials are easy to obtain. These fourth monomers all have only one ring and no long branch chain, and when reacted onto the polymer, can better exert the rigid performance and steric hindrance effect of the fourth monomer.

As an improvement to the binder of this application, a mass percentage of the fourth monomer in the polymer is 0.5% to 10%. To be specific, based on a mass of the polymer, the mass percentage of the fourth monomer is 0.5% to 10%, preferably 0.5% to 8%, and further preferably 1% to 8%. When the mass percentage of the fourth monomer is less than 0.5%, the rigidity of the polymer cannot be effectively increased, and when the mass percentage of the fourth monomer is higher than 10%, the synthesis reaction is violent and explosive polymerization is prone to occur.

As an improvement to the binder of this application, in the foregoing polymer, the first monomer is selected from aromatic alkenyl compounds, the second monomer is selected from ethylenically unsaturated carboxylic acids or ethylenically unsaturated carboxylic acid salts, and the third monomer is selected from ethylenically unsaturated carboxylates.

The aromatic alkenyl compounds include aromatic vinyl compounds. The aromatic vinyl compound monomer unit is not particularly limited and may include, for example, any one or more of the following: styrene. α-methylstyrene, divinylbenzene, tert-butylstyrene, meta-methylstyrene, para-ethylstyrene, 1,1-diphenylethylene, vinyl naphthalene, vinyl anthracene, or vinyl pyridine. Preferably, the aromatic vinyl compound includes at least one of styrene, α-methylstyrene, or divinylbenzene. More preferably, the aromatic vinyl compound is selected from styrenes. In the aromatic vinyl monomer units, the styrene unit is preferred due to its easy availability of raw materials.

If the first monomer used in the polymer is two or more of the foregoing aromatic vinyl compounds, the proportion of styrene, α-methylstyrene, divinylbenzene, tert-butylstyrene, meta-methylstyrene, para-ethylstyrene, 1,1-diphenylethylene, vinyl naphthalene, vinyl anthracene, and vinyl pyridine is not limited, provided that the proportion of their total mass in the polymer is within the proportion range defined in this application.

The ethylenically unsaturated carboxylic acid or ethylenically unsaturated carboxylic acid salt monomer unit is not particularly limited and may include, for example, any one or more of the following: acrylic acid, methacrylic acid, lithium acrylic acid, potassium acrylic acid, sodium acrylic acid, lithium methacrylic acid, potassium methacrylic acid, or sodium methacrylic acid. More preferably, the ethylenically unsaturated carboxylic acid is selected from acrylic acids. In the ethylenically unsaturated carboxylic acid monomer units, the acrylic acid is preferred due to its easy availability of raw materials.

If the second monomer used in the polymer is two or more of the foregoing ethylenically unsaturated carboxylic acids or ethylenically unsaturated carboxylic acid salts, the proportion of acrylic acid, methacrylic acid, lithium acrylic acid, potassium acrylic acid, sodium acrylic acid, lithium methacrylic acid, potassium methacrylic acid, and sodium methacrylic acid is not limited, provided that the proportion of their total mass in the polymer is within the proportion range defined in this application.

As an improvement to the binder of this application, the ethylenically unsaturated carboxylate includes an alkyl acrylate or an alkyl methacrylate. More preferably, the ethylenically unsaturated carboxylate includes alkyl acrylate with 1-10 carbon atoms (C1 to C10 alkyl) or alkyl methacrylate with 1-10 carbon atoms (C1 to C10 alkyl). Specifically, the ethylenically unsaturated carboxylate monomer unit is not particularly limited and may include, for example, any one or more of the following: methyl acrylate, ethyl acrylate, isopropyl acrylate, n-butyl acrylate, hexyl acrylate, heptyl acrylate, 2-ethylhexyl acrylate, lauryl acrylate, methyl methacrylate, ethyl methacrylate, propyl methacrylate, isobutyl methacrylate, or 2-ethylhexyl methacrylate.

If the third monomer used in the polymer is two or more of the foregoing ethylenically unsaturated carboxylate salts, the proportion of methyl acrylate, ethyl acrylate, isopropyl acrylate, n-butyl acrylate, hexyl acrylate, heptyl acrylate, 2-ethylhexyl acrylate, lauryl acrylate, methyl methacrylate, ethyl methacrylate, propyl methacrylate, isobutyl methacrylate, and 2-ethylhexyl methacrylate is not limited, provided that the proportion of their total mass in the polymer is within the proportion range defined in this application.

As an improvement to the binder of this application, the mass proportions of the first monomer, the second monomer, and the third monomer are preferably within their appropriate ranges. Based on the mass of the polymer, the mass percentage of the first monomer in the polymer is 5% to 45%, preferably 10% to 45%; the mass percentage of the third monomer in the polymer is 5% to 44.5%, preferably 10% to 44.5%; and the mass percentage of the second monomer in the polymer is 0.5% to 89.5%, preferably 1.5% to 79.5%.

The mass fractions of the first monomer, second monomer, and third monomer within the foregoing ranges neither lead to problems such as low adhesion of the binder due to excessively high mass percentage, abnormal slurry processing, or relatively poor compatibility with the electrolyte, nor result in a relatively poor effect of suppressing the expansion of electrode plates due to excessively low mass percentage.

In a specific implementation of this application, the binder is an improved styrene-acrylic emulsion in terms of type, and the polymerization method can be emulsion polymerization. Specifically, the binder can be prepared by the following method:

One portion of an emulsifier is mixed with a first monomer, a second monomer, and a third monomer at a specific ratio and rapidly emulsified in a specified amount of water to obtain a pre-emulsion. Then, an initiator and another portion of the emulsifier are mixed with and dissolved well in a specified amount of water, and a resulting mixture is added to a first dropper, resulting in an initiator emulsion. Approximately one-third of the pre-emulsion obtained is poured into a reactor, heated and stirred, and the remaining approximately two-thirds of the pre-emulsion are added to a second dropper. When the temperature reaches 60 °C to 80 °C the initiator emulsion from the first dropper is slowly added to the reactor, and simultaneously, a specific proportion of the fourth monomer is added dropwise using a third dropper; and with the temperature controlled at approximately 80 °C, the pre-emulsion from the second dropper is slowly added, the solid content of the emulsion is maintained at about 50% (blueing state), and the temperature is maintained for 0.5 hours to 4 hours. After reactions are completed, the temperature is lowered to room temperature, and the pH value is adjusted to approximately between 7 and 8 to obtain the binder.

The preparation process of the binder is simple, easy to control, highly feasible, has minimal environmental pollution, and is suitable for large-scale industrial production.

Optionally, the emulsifier can be, for example, high-level fatty alcohol polyoxyethylene ether, alkylphenol polyoxyethylene ether, a carboxylic acid salt such as potassium laurate, a sulfate ester salt such as sodium dodecyl sulfate, a sulfonic acid salt such as sodium bis(2-ethylhexyl) sulfosuccinate, or the like. In the process of preparing the binder, a mass of the one portion of the emulsifier added is 0.05% to 10% of a total mass of the first monomer, the second monomer, the third monomer, and the fourth monomer, preferably 0.1% to 8%.

Optionally, a mass ratio of the one portion of the emulsifier to the another portion of the emulsifier is 2:1 to 6:1, preferably 3:1 to 5:1.

Optionally, the initiator can be, for example, azobisisobutyronitrile, azobisisoheptylnitrile, azobiscyclohexylcarbonitrile, benzoyl peroxide, tert-butyl hydroperoxide, ammonium persulfate, potassium persulfate, azobisisobutylamidine hydrochloride (V-50 initiator), azobisisobutylimidazoline hydrochloride (VA-044 initiator), azobisisobutylimidazoline (VA061 initiator), or the like. In the process of preparing the binder, a mass of the initiator added is 0.01% to 1% of the total mass of the first monomer, the second monomer, the third monomer, and the fourth monomer, preferably 0.05% to 0.6%.

Optionally, the mass percentage of the first monomer in the polymer is 5% to 45%, preferably 10% to 45%; the mass percentage of the second monomer in the polymer is 0.5% to 89.5%, preferably 1.5% to 79.5%; the mass percentage of the third monomer in the polymer is 5% to 44.5%, preferably 10% to 44.5%; and the mass percentage of the fourth monomer in the polymer is 0.5% to $1^{0}$/a, preferably 0.5% to 8%, and further preferably 1% to 8%.

During the preparation of the binder, along with azo or organic peroxide compounds of initiators, the fourth monomer is also added. The addition of the fourth monomer at this stage can fully exert the function of the fourth monomer, alleviate the expansion of electrode plates during battery cycling, and improve the cycling performance of batteries.

For the binder prepared by using the foregoing solvent system or monomer system and the preferred emulsifiers and initiator within the specified proportion ranges and under the preferred polymerization reaction atmosphere, temperature, and time, the types and proportions of emulsifiers and initiator are appropriate, the reaction conditions are mild, and the resulting binder exhibits excellent stability and adhesive performance.

Electrochemical Apparatus

According to another aspect of this application, this application relates to an electrochemical apparatus including a positive electrode, a negative electrode, an electrolyte, and a separator, where at least one of the positive electrode, the negative electrode, and the separator includes the binder of this application.

During the synthesis of the binder of this application, along with azo or organic peroxide compounds of initiators, the fourth monomer is also added. The addition of the fourth monomer results in an increased rigidity of the cross-linked polymer, and a relatively large steric hindrance makes it difficult for molecular chains to slide, thereby improving the tensile strength and adhesive strength, so that the expansion of electrode plates during battery cycling is effectively alleviated. In addition, the addition of this cyclic compound monomer having two double bond structures makes the polymer have a particular networked structure, and this olefin monomer is of low polarity, insoluble in carbonate/carboxylate solution in the electrolyte, thereby improving the electrolyte resistance performance of the binder and helping to improve physical properties of the adhesive film. Therefore, the electrochemical apparatuses such as secondary batteries prepared using the binder can significantly improve the cycle life of lithium-ion batteries.

The binder of this application can be used in the preparation of positive electrode/negative electrode. A mixture including a positive electrode active substance/negative electrode active substance and the binder is prepared into a slurry, and the slurry is applied on a current collector and dried to obtain a positive electrode/negative electrode. Alternatively, the binder of this application can be applied on the separator for binding of the positive electrode plate and the separator, or for binding of the negative electrode plate and the separator. The binder of this application is particularly preferable as a binder for the negative electrode of the secondary battery because the problems caused by the binding of the negative electrode in the secondary battery are more significant.

The negative electrode includes a negative electrode current collector and a negative electrode active substance layer applied on a surface of the negative electrode current collector.

As an improvement to the negative electrode in this application, the negative electrode active substance layer includes a negative electrode active substance, a conductive agent, and a binder, where the binder includes the foregoing polymer.

As an improvement to the negative electrode in this application, a mass percentage of the binder in the negative electrode active substance layer is 0.5% to 8%, preferably 1% to 4%, and further preferably 1% to 2%. In the negative electrode active substance layer, when the percentage of the binder is less than 0.5%, especially less than 1%, the improvement in suppressing the expansion of the negative electrode plate cannot achieve the desired effect, but a too-high percentage of the binder, such as exceeding 8%, causes the internal resistance of the battery to be high, deteriorates the cycling performance, and may impair the energy density of the battery.

Optionally, the negative electrode active substance includes but is not limited to at least one of a graphite-based material or a silicon-based material. Specific examples of the negative electrode active substance may include one or more of artificial graphite, natural graphite, silicon, silicon oxide compounds, silicon-carbon composite materials, soft carbon, and hard carbon.

Preferably, the conductive agent includes but is not limited to one or more of conductive carbon black, carbon fiber, graphene, Ketjen black, single-walled carbon nanotubes, or multi-walled carbon nanotubes.

Optionally, the negative electrode active substance layer further includes a thickener. Known thickeners used in the preparation of negative electrode plates in the art can be used as the thickener.

The negative electrode current collector for holding the negative electrode active substance may use any well-known current collector. Examples of the negative electrode current collector include but are not limited to metal materials such as aluminum, copper, nickel, stainless steel, and nickel plated steel. In some embodiments, the negative electrode current collector is a copper foil.

Methods for preparing negative electrodes using a binder are well known to those skilled in the art. Optionally, a method for preparing negative electrodes using the binder of this application is as follows: The binder of this application, a conductive agent, a negative electrode active substance, and an optional thickener are mixed in deionized water to obtain a slurry; and the obtained slurry is applied onto a negative electrode current collector, followed by drying and cold pressing, to form a negative electrode active substance layer on the negative electrode current collector. In this way, a negative electrode can be obtained.

The slurry making equipment used to prepare the slurry is not particularly limited. For example, dual planetary mixers, horizontal mixers, screw kneaders, and the like can be listed as examples.

The specific method of applying the slurry onto the negative electrode current collector is not particularly limited. For example, the slurry can be applied onto the surface of the negative electrode current collector through methods such as extrusion, transfer, gravure, and spraying.

The solvent for the slurry is also not particularly limited. For example, commonly used water or other organic solvents can be used. Organic solvents include but are not limited to N-methylpyrrolidone, N,N-dimethylformamide, and N,N-dimethylacetamide.

In addition, another method can be used to prepare negative electrodes using the binder of this application: directly applying the binder of this application onto a current collector to form a coating. The negative electrode includes the binder of this application. Specifically, the negative electrode includes a negative electrode current collector, a coating, and a negative electrode active substance layer, and the coating layer is provided between the negative electrode current collector and the negative electrode active substance coating, and the coating includes the binder of this application.

As an improvement to the positive electrode, the positive electrode includes a positive electrode current collector and a positive electrode active substance layer applied on surface of the positive electrode current collector. Further, the positive electrode active substance layer includes a positive electrode active substance, a conductive agent and a binder.

As an improvement to the binder in the positive electrode, the binder includes but is not limited to at least one of polyvinyl alcohol, polytetrafluoroethylene, polyvinylidene fluoride, sodium carboxymethyl cellulose, water-based acrylic resin, ethylene-vinyl acetate copolymer, styrene-butadiene rubber, fluorinated rubber, and polyurethane.

As an improvement to the positive electrode active substance, the positive electrode active substance may be a lithium transition metal composite compound or a lithium-containing transition metal phosphate compound. Examples of the positive electrode active substance may include but are not limited to at least one of lithium cobalt oxides, lithium nickel oxides, lithium manganese oxides, lithium nickel manganese oxides, lithium nickel cobalt manganese oxides, and lithium nickel cobalt aluminum oxides.

As an improvement to the conductive agent, the conductive agent includes but is not limited to carbon materials, such as at least one selected from graphite, carbon black, graphene, and carbon nanotube conductive fibers. Commonly used conductive agents include Ketjen Black (ultrafine conductive carbon black, with a particle size of 30-40 nm), SP (Super P, small particle conductive carbon black, with a particle size of 30-40 μm), S—O (ultrafine graphite powder, with a particle size of 3-4 μm), KS-6 (large particle graphite powder, with a particle size of 6.5 μm), acetylene black, VGCF (vapor-grown carbon fiber, with a particle size of 3-20 μm). Selectable conductive agents also include metal powders, conductive whiskers, conductive metal compounds, conductive polymers, and the like.

As an improvement to the positive electrode, in the positive electrode active substance layer, the mass percentage of the positive electrode active substance is 80% to 98%, the mass percentage of the binder is 1% to 10%, and the mass percentage of the conductive agent is 1% to 10%.

As an improvement to the electrolyte, the electrolyte includes an organic solvent, a lithium salt, and an additive.

As an improvement to the organic solvent, the organic solvent is one or more conventional organic solvents selected from cyclic carbonates, linear carbonates, carboxylates, and the like. Specifically, the organic solvent can be one or more selected from but not limited to the following organic solvents: ethylene carbonate (EC), propylene carbonate (PC), diethyl carbonate (DEC), ethyl methyl carbonate (EMC), dimethyl carbonate (DMC), fluoroethylene carbonate (FEC), vinylene carbonate (VC), propylene carbonate, dipropyl carbonate, methyl formate, ethyl formate, ethyl propionate (EP), propyl propionate, methyl butyrate, and ethyl acetate.

As an improvement to the lithium salt, the lithium salt is at least one selected from inorganic lithium salts and organic lithium salts. The inorganic lithium salt is at least one selected from lithium hexafluorophosphate ($LiPF_6$), lithium tetrafluoroborate ($LiBF_4$), lithium hexafluoroarsenate ($LiAsF_6$), and lithium perchlorate ($LiClO_4$). The organic lithium salt is at least one selected from lithium bisoxalate borate ($LiB(C_2O_4)_2$, abbreviated as LiBOB), lithium bisfluorosulfonyl imide (LiFSI), and lithium bistrifluoronethanesulfonyl imide (LiTFSI).

As an improvement of the additive, the additive is one or more selected from fluorine-containing, sulfur-containing, or unsaturated double bond-containing compounds. Specifically, the additive can be one or more selected from but not limited to the following substances: fluoroethylene carbonate, vinyl sulfite, propane sultone, N-methylpyrrolidone, N-methylformamide, N-methylacetamide, acetonitrile, acrylonitrile, γ-butyrolactone, and methyl sulfide.

In order to prevent short circuit, a separator is typically provided between the positive electrode and the negative electrode. In this case, the electrolyte typically permeates the separator for use.

The material and shape of the separator are not particularly limited in this application, provided that the separator does not significantly impair the effects of this application. The separator may be a resin, glass fiber, inorganic substance, or the like made of a material stable to the electrolyte.

In the electrochemical apparatus of this application, the material of the separator includes but is not limited to a polymer separator. For example, the separator may be selected from one of polyethylene, polypropylene, or ethylene-propylene copolymer.

The electrochemical apparatus of this application includes any apparatus in which electrochemical reactions take place. Specific examples of the apparatus include all kinds of primary batteries, secondary batteries, fuel batteries, solar batteries, or capacitors. Especially, the electrochemical apparatus is a lithium secondary battery, including a lithium metal secondary battery, a lithium-ion secondary battery, a lithium polymer secondary battery, or a lithium-ion polymer secondary battery.

In some embodiments of this application, a lithium-ion secondary battery is used as an example. A positive electrode plate, a separator, and a negative electrode plate are wound or stacked in sequence to form an electrode assembly, and the electrode assembly is then packaged, for example, in an aluminum-plastic film, followed by injection of an electrolyte, formation, and sealing, so that the lithium-ion secondary battery is prepared. Then, a performance test and a cycle test are performed on the prepared lithium-ion battery. Those skilled in the art will understand that the method for preparing the electrochemical apparatus (for example, lithium-ion battery) described above is only an embodiment. Without departing from the content disclosed in this application, other methods commonly used in the art may be used.

Optionally, the lithium-ion secondary battery may be a winding type, a stacked type, or a multi-tab structure type lithium-ion battery.

In addition, a shape of an outer packing case for the lithium-ion secondary battery may be arbitrary, and may be, for example, any of cylindrical, rectangular, laminated, button-shaped, large-sized, or the like.

Electronic Device

According to a further aspect of this application, this application relates to an electronic device including the foregoing electrochemical apparatus.

The purpose of the electrochemical apparatus of this application is not particularly limited. It can be used for any known electronic devices in the prior art.

In some embodiments, the electrochemical apparatus of this application may be used for, without limitation, a notebook computer, a pen-input computer, a mobile computer, an electronic book player, a portable telephone, a portable fax machine, a portable copier, a portable printer, a stereo headset, a video recorder, a liquid crystal television, a portable cleaner, a portable CD player, a mini-disc, a transceiver, an electronic notebook, a calculator, a memory card, a portable recorder, a radio, a standby power source, a motor, an automobile, a motorcycle, a motor bicycle, a bicycle, a lighting appliance, a toy, a game console, a clock, an electric tool, a flash lamp, a camera, a large household battery, and a lithium-ion capacitor.

The following uses a lithium-ion battery as an example and describes the preparation of lithium-ion batteries with reference to specific examples. Those skilled in the art understand that the preparation method described in this application is only an example and that all other suitable preparation methods fall within the scope of this application.

The following describes performance evaluation performed based on examples and comparative examples of the lithium-ion battery in this application. In the following examples and comparative examples, all reagents, materials, and instruments used are commercially available unless otherwise specified.

EXAMPLES AND COMPARATIVE EXAMPLES

Preparation of Binder (1) Preparation of Binder 1

Two parts of fatty alcohol polyoxyethylene ether, 25 parts of styrene, 24 parts of butyl acrylate, and 1.5 parts of acrylic acid were mixed at the specific ratio and rapidly emulsified in 39.95 parts of water to obtain a pre-emulsion.

Then, 0.05 parts of azobisisobutyronitrile and 0.5 parts of fatty alcohol polyoxyethylene ether were mixed with and dissolved well in 6 parts of water, and a resulting solution was added to a first dropper to obtain an initiator emulsion.

One-third of the pre-emulsion obtained was poured into a reactor, heated and stirred, and the remaining two-thirds of the pre-emulsion were added to a second dropper. When the temperature reached 80 °C, the initiator emulsion was slowly added to the reactor using the first dropper, and simultaneously, 1 part of cyclopentadiene monomer was added using a third dropper. The temperature was controlled to be at 80 °C, and the remaining two-thirds of the emulsion from the second dropper were slowly added while the emulsion was maintained at a blueing state, and the temperature was maintained for 4 hours. After reactions were completed, the temperature was lowered to room temperature, and the pH value was adjusted to between 7 and 8 to obtain the binder emulsion.

(2) Preparation of Binders 2 to 7

The preparation process of the binder 2 was the same as that of the binder 1, and the difference of the binder 2 from the binder 1 was that 3 parts of cyclopentadiene monomer were used.

The preparation process of the binder 3 was the same as that of the binder 1, and the difference of the binder 3 from the binder 1 was that 5 parts of cyclopentadiene monomer were used.

The preparation process of the binder 4 was the same as that of the binder 1, and the difference of the binder 4 from the binder 1 was that 8 parts of cyclopentadiene monomer were used.

The preparation process of the binder 5 was the same as that of the binder 1, and the difference of the binder 5 from the binder 1 was that 10 parts of cyclopentadiene monomer were used.

The preparation process of the binder 6 was the same as that of the binder 1, and the difference of the binder 6 from the binder 1 was that 8 parts of methylcyclopentadiene monomer were used.

The preparation process of the binder 7 was the same as that of the binder 1, and the difference of the binder 7 from the binder 1 was that 8 parts of cyclohexadiene monomer were used.

(3) Preparation of Binder 1 #

Binder 1 # used a prior-art SBR emulsion.

The preparation method of the prior-art SBR emulsion included: 0.2 parts of vinyl polyoxyethylene ether ammonium sulfate, 0.5 parts of 2-methyl-2-propenoic acid-2-hydroxyethyl ester phosphate, and 0.1 parts of potassium persulfate were added with 150 parts of distilled water and completely dissolved into an aqueous solution. Then, 0.5 parts of acrylic acid, 10 parts of butadiene, 88.4 parts of styrene, and 0.1 parts of dodecanethiol were added. A resulting mixture was stirred and heated under conditions of 0.6 MPa and 70 °C for a polymerization reaction for 4 hours. After reactions were completed, the mixture was cooled to 25 °C, neutralized with 0.2 parts of triethanolamine, and filtered through a 100-mesh sieve to obtain the SBR emulsion.

Specific types and mass percentages of monomers in the foregoing binders 1 to 7 and binder 1 # are shown in Table 1.

TABLE 1

| | Fourth monomer | | Third monomer | | Second monomer | | First monomer | |
|---|---|---|---|---|---|---|---|---|
| | Type | Percentage (%) | Type | Percentage (%) | Type | Percentage (%) | Type | Percentage (%) |
| 1 | Cyclopentadiene | 1 | Butyl acrylate | 24 | Acrylic acid | 1.5 | Styrene | 25 |
| 2 | Cyclopentadiene | 3 | Butyl acrylate | 24 | Acrylic acid | 1.5 | Styrene | 25 |
| 3 | Cyclopentadiene | 5 | Butyl acrylate | 24 | Acrylic acid | 1.5 | Styrene | 25 |
| 4 | Cyclopentadiene | 8 | Butyl acrylate | 24 | Acrylic acid | 1.5 | Styrene | 25 |
| 5 | Cyclopentadiene | 10 | Butyl acrylate | 24 | Acrylic acid | 1.5 | Styrene | 25 |

TABLE 1-continued

| | Fourth monomer | | Third monomer | | Second monomer | | First monomer | |
|---|---|---|---|---|---|---|---|---|
| | Type | Percentage (%) | Type | Percentage (%) | Type | Percentage (%) | Type | Percentage (%) |
| 6 | Methylcyclopentadiene | 8 | Butyl acrylate | 24 | Acrylic acid | 1.5 | Styrene | 25 |
| 7 | Cyclohexadiene | 8 | Butyl acrylate | 24 | Acrylic acid | 1.5 | Styrene | 25 |
| 1# | — | — | 2-methyl-2-propenoic acid-2-hydroxyethyl ester phosphate | 0.5 | Acrylic acid and butadiene | 0.5, 10 | Styrene | 88.4 |

"—" indicates that the substance is not added.

Preparation of Lithium-Ion Battery (1) Preparation of Negative Electrode

Negative electrode active substance artificial graphite, conductive agent conductive carbon black (Super P), thickener sodium carboxymethyl cellulose (Daicel 2200), and the negative electrode binder prepared above at a mass ratio of 97.3%:0.5%:1.2%:1.0% were added to solvent water, and a negative electrode slurry was produced by using a ROSS double planetary mixer. The negative electrode slurry was applied using an extrusion coater at a coating speed of 18 m/min onto the surface of a 6 μm copper foil serving as the negative electrode current collector. Subsequently, baking in an oven was carried out until the electrode plate was fully dried to obtain a negative electrode.

(2) Preparation of Positive Electrode

Positive electrode active substance lithium cobaltate, conductive agent acetylene black, binder polyvinylidene fluoride, and solvent NMP were mixed and stirred to produce a positive electrode slurry. The positive electrode slurry was applied on the surface of a 6 μm aluminum foil serving as the positive electrode current collector, and dried to obtain a positive electrode.

(3) Preparation of Electrolyte

In the electrolyte, the concentration of lithium hexafluorophosphate was 1 mol/L, and the organic solvent was composed of ethylene carbonate, propylene carbonate, diethyl carbonate, ethyl propionate, fluoroethylene carbonate, and 1,3-propanesultone.

(4) Separator

A separator with one side coated by ceramic and two sides coated with water-based vinylidene fluoride-hexafluoropropylene copolymer was used.

(5) Preparation of Lithium-Ion Battery

The positive and negative electrodes with tabs welded thereto were wound with the separator into a battery cell and the battery cell was packaged with aluminum-plastic film, baked in a vacuum state for 24 hours to remove moisture, the foregoing electrolyte was injected into the battery cell and the battery cell was left standing at high temperature. Then the battery underwent formation and sorting, and a prismatic soft pack lithium-ion battery of 3.8 mm thickness, 64 mm width, and 82 mm height was obtained.

In Examples 1 to 7, during the preparation of the negative electrode, the foregoing binders 1 to 7 were respectively used, and corresponding lithium-ion batteries B1 to B7 were obtained using the method described above.

In Comparative example 1, during the preparation of the negative electrode, the foregoing binder 1 # was used, and a corresponding lithium-ion battery D1 was obtained using the method described above.

Performance Test

Methods for measuring various performance parameters of Examples and Comparative Examples were as follows.

(1) Electrode Plate Peeling Force

An electrode plate under test was taken and a sample with a width of 30 mm and a length of 100-160 mm was cut out using a blade. A special double-sided adhesive with a width of 20 mm and a length of 90-150 mm was pasted to a steel plate. The electrode plate sample cut out in the previous step was pasted to the double-sided adhesive, with a test surface facing downward. A paper tape with a width equal to that of the electrode plate and a length 80-200 mm greater than that of the sample was inserted below the electrode plate and fastened using crepe tape. A tensile machine was powered up with the indicator light on, and a limit block was adjusted to a suitable position. The end of the steel plate with no electrode plate attached was fixed with the lower clamp. The paper tape was folded upwards and fixed with the upper clamp, and the "Up" and "Down" buttons on the manual controller accompanying the tensile machine was used to adjust the position of the upper clamp. Data was recorded.

(2) Wet Film Peeling Force

The electrode plate under test was immersed into the electrolyte for 24 hours, taken out with the surface moisture dried using absorbent paper. Then, the same steps as described in (1) above followed to test the electrode plate peeling force.

(3) Slurry Stability

A cup of slurry was taken and left at room temperature for 24 hours (or 48 hours). An iron piece or a scraper was used to collect the slurry from the bottom. Then, the iron piece or scraper was held vertically, allowing the slurry on the iron piece or scraper to flow naturally. Clumps of slurry remaining on the iron piece or scraper and unable to flow down smoothly indicated slurry sedimentation; otherwise, no slurry sedimentation occurred.

(4) Full Charge Rebound of Electrode Plate

The coated and dried electrode plate was laid flat, and a micrometer was used to measure the thickness of the electrode plate, recorded as h1. A battery produced was charged to its full capacity and disassembled to take out the battery cell. Then the electrode plate was removed and laid flat, and a micrometer was used to measure the thickness of the electrode plate, recorded as h2. The full charge rebound rate of the electrode plate was calculated using the following equation:

$$\text{full charge rebound rate of electrode plate}=(h1-h2)/h1\times100\%.$$

(5) Storage at Full Charge at 60 °C

An initial thickness of a battery was measured using a micrometer and recorded as h3. The battery was charged to full capacity, placed in a high-temperature box at 60 °C for 30 days and then removed. A micrometer was used to measure the thickness of the battery, recorded as h4. The storage rebound rate of the battery at 60 °C at full charge was calculated using the following equation:

storage rebound rate at full charge at 60 °C (30 days)=$(h3-h4)/h3\times100\%$.

(6) Storage at Full Charge at 85 °C

An initial thickness of a battery was measured using a micrometer and recorded as h5. The battery was charged to full capacity, placed in a high-temperature box at 85°'C for 7 hours and then removed. A micrometer was used to measure the thickness of the battery, recorded as h6. The battery storage rebound rate at full charge at 85 °C was calculated using the following equation:

storage rebound rate at 85 °C at full charge (7 $h$)=$(h5-h6)/h5\times100\%$.

(7) Capacity Retention Rate After 500 Cycles at 25 °C

A battery was initially charged and discharged for one cycle, and the initial capacity was recorded as $q_1$. The battery was charged and discharged continuously for 500 cycles, and the capacity after 500 cycles was recorded as $q_2$. The battery capacity retention rate after 500 cycles at 25 °C was calculated using the following equation:

capacity retention rate after 500 cycles at 25 °C=$(q_1-q_2)/q_1\times100\%$.

(8) Battery Swelling Rate After 500 Cycles at 25 °C

An initial thickness of a battery was measured using a micrometer and recorded as h7. The battery was charged to full capacity, placed in a thermostat, and charged and discharged for 500 cycles. A micrometer was used to measure the thickness of the battery, recorded as h8. The battery swelling rate after 500 cycles at 25 °C was calculated using the following equation:

battery swelling rate after 500 cycles at 25 °C=$(h7-h8)/h8\times100\%$.

Test Result

Table 2 shows performance test results of corresponding lithium-ion batteries in Examples 1 to 7 and Comparative example 1.

TABLE 2

| Item | Electrode plate peeling force N/m | Wet film peeling force N/m | Slurry stability 48 h | Full charge rebound of electrode plate (%) | Storage at full charge at 60° C. 30 d | Storage at full charge at 85° C. 7 h | Capacity retention rate after 500 cycles at 25° C. | Battery swelling tate after 500 eyeles at 25° C. |
|---|---|---|---|---|---|---|---|---|
| Example 1 | 9.2 | 4.3 | No sedimentation | 23.87% | 12.75% | 18.21% | 92.7% | 8.11% |
| Example 2 | 11.0 | 5.9 | No sedimentation | 23.45% | 10.54% | 16.87% | 93.0% | 7.46% |
| Example 3 | 15.2 | 7.2 | No sedimentation | 23.19% | 5.89% | 15.55% | 93.2% | 7.09% |
| Example 4 | 18.3 | 9.1 | No sedimentation | 21.44% | 7.36% | 15.25% | 93.3% | 6.46% |
| Example 5 | 18.5 | 8.7 | No sedimentation | 22.03% | 7.40% | 15.32% | 93.1% | 6.53% |
| Example 6 | 18.9 | 9.3 | No sedimentation | 22.66% | 7.42% | 15.43% | 93.1% | 6.56% |
| Example 7 | 18.5 | 9.0 | No sedimentation | 22.83% | 7.38% | 15.57% | 93.2% | 6.50% |
| Comparative example 1 | 11.1 | 1.5 | No sedimentation | 23.23% | 12.86% | 18.71% | 92.8% | 8.35% |

As per the data shown in Table 2 above, the binder of this application applied to the negative electrode plate of a lithium-ion battery can significantly increase the electrode plate peeling force and the wet film peeling force and therefore can improve the full charge rebound of the electrode plate and the high-temperature storage performance. The relatively high adhesion helps maintain the structural integrity of the electrode plates during battery cycling. Therefore, the lithium-ion batteries provided in Examples 1 to 5 of this application exhibit a higher capacity retention rate and a lower battery swelling rate after 500 cycles compared to the lithium-ion battery provided in Comparative example 1. Furthermore, it can be learned from the comparisons among Examples 1 to 5 that, with an increase in the amount of the fourth monomer added, the electrode plate peeling force and the wet film peeling force first increase and then decrease, and the corresponding electrical performance follows the same trend. The optimal amount of the fourth monomer added is approximately 8%. It can be learned from the comparisons among Examples 1 to 5 and Examples 6 and 7 that with methylcyclopentadiene as the fourth monomer, the electrode plate peeling force and wet film peeling force of the battery are highest, and the full charge rebound, high-temperature storage performance, capacity retention rate, and battery swelling rate of the battery are optimal.

Although this application is disclosed above with preferred embodiments, they are not intended to limit the claims. Any person skilled in the art can make a number of possible changes and modifications without departing from the concept of this application. Therefore, the protection scope of this application shall be subject to the scope defined by the claims of this application.

What is claimed is:

1. A binder comprising a polymer; the polymer being obtained by polymerizing a first monomer, a second monomer, a third monomer, and a fourth monomer;

wherein the first monomer, the second monomer, and the third monomer are each independently selected from aromatic alkenyl compounds, ethylenically unsaturated carboxylic acids, ethylenically unsaturated carboxylic acid salts, or ethylenically unsaturated carboxylates; the first monomer, the second monomer, and the third monomer are different from each other; and the fourth monomer comprises a substituted or unsubstituted cyclic compound having at least one double bond;

wherein a mass percentage of the fourth monomer in the polymer is 0.5% to 8%.

2. The binder according to claim 1, wherein the fourth monomer comprises a substituted or unsubstituted cyclic compound having at least two double bonds.

3. The binder according to claim 2, wherein the cyclic compound having at least two double bonds comprises a cyclic diene; or at least one aromatic ring-containing diene and at least one non-aromatic cyclic diene; or at least one non-aromatic monocyclic diene and at least one non-aromatic polycyclic diene.

4. The binder according to claim 3, wherein the cyclic compound having at least two double bonds comprises the cyclic diene; and the cyclic diene comprises at least one of cyclopentadiene, alkylcyclopentadiene, cyclohexadiene, alkylcyclohexadiene, cycloheptadiene, alkylcycloheptadiene, cyclooctadiene, or alkylcyclooctadiene.

5. The binder according to claim 1, wherein the first monomer comprises an aromatic alkenyl compound, the second monomer comprises an ethylenically unsaturated carboxylic acid or an ethylenically unsaturated carboxylic acid salt, and the third monomer comprises an ethylenically unsaturated carboxylate.

6. The binder according to claim 5, wherein the aromatic alkenyl compound comprises at least one of styrene, α-methylstyrene, divinylbenzene, tert-butylstyrene, meta-methylstyrene, para-ethylstyrene, 1,1-diphenylethylene, vinyl naphthalene, vinyl anthracene, or vinyl pyridine.

7. The binder according to claim 5, wherein the ethylenically unsaturated carboxylic acid or ethylenically unsaturated carboxylic acid salt comprises at least one of acrylic acid, methacrylic acid, lithium acrylic acid, potassium acrylic acid, sodium acrylic acid, lithium methacrylic acid, potassium methacrylic acid, or sodium methacrylic acid.

8. The binder according to claim 5, wherein the ethylenically unsaturated carboxylate comprises at least one of methyl acrylate, ethyl acrylate, isopropyl acrylate, n-butyl acrylate, hexyl acrylate, heptyl acrylate, 2-ethylhexyl acrylate, lauryl acrylate, methyl methacrylate, ethyl methacrylate, propyl methacrylate, isobutyl methacrylate, or 2-ethylhexyl methacrylate.

9. The binder according to claim 1, wherein a mass percentage of the first monomer in the polymer is 5% to 45%; a mass percentage of the second monomer in the polymer is 0.5% to 89.5%; and a mass percentage of the third monomer in the polymer is 5% to 44.5%.

10. An electrochemical apparatus comprising a positive electrode, a negative electrode, an electrolyte, and a separator, wherein at least one of the positive electrode, the negative electrode, and the separator comprises a binder; the binder comprising a polymer, the polymer being obtained by polymerizing a first monomer, a second monomer, a third monomer, and a fourth monomer;

wherein the first monomer, the second monomer, and the third monomer are each independently selected from aromatic alkenyl compounds, ethylenically unsaturated carboxylic acids, ethylenically unsaturated carboxylic acid salts, or ethylenically unsaturated carboxylates; the first monomer, the second monomer, and the third monomer are different from each other; and the fourth monomer comprises a substituted or unsubstituted cyclic compound having at least one double bond;

wherein a mass percentage of the fourth monomer in the polymer is 0.5% to 8%.

11. The electrochemical apparatus according to claim 10, wherein the fourth monomer comprises a substituted or unsubstituted cyclic compound having at least two double bonds.

12. The electrochemical apparatus according to claim 11, wherein the cyclic compound having at least two double bonds comprises a cyclic diene; or at least one aromatic ring-containing diene and at least one non-aromatic cyclic diene; or at least one non-aromatic monocyclic diene and at least one non-aromatic polycyclic diene.

13. The electrochemical apparatus according to claim 12, wherein the cyclic compound having at least two double bonds comprises the cyclic diene; and the cyclic diene comprises at least one of cyclopentadiene, alkylcyclopentadiene, cyclohexadiene, alkylcyclohexadiene, cycloheptadiene, alkylcycloheptadiene, cyclooctadiene, or alkylcyclooctadiene.

14. The electrochemical apparatus according to claim 10, wherein the first monomer comprises an aromatic alkenyl compound, the second monomer comprises an ethylenically unsaturated carboxylic acid or an ethylenically unsaturated carboxylic acid salt, and the third monomer comprises an ethylenically unsaturated carboxylate.

15. The electrochemical apparatus according to claim 14, wherein the aromatic alkenyl compound comprises at least one of styrene, α-methylstyrene, divinylbenzene, tert-butylstyrene, meta-methylstyrene, para-ethylstyrene, 1,1-diphenylethylene, vinyl naphthalene, vinyl anthracene, or vinyl pyridine.

16. The electrochemical apparatus according to claim 14, wherein the ethylenically unsaturated carboxylic acid or ethylenically unsaturated carboxylic acid salt comprises at least one of acrylic acid, methacrylic acid, lithium acrylic acid, potassium acrylic acid, sodium acrylic acid, lithium methacrylic acid, potassium methacrylic acid, or sodium methacrylic acid.

17. The electrochemical apparatus according to claim 10, wherein a mass percentage of the first monomer in the polymer is 5% to 45%; a mass percentage of the second monomer in the polymer is 0.5% to 89.5%; and a mass percentage of the third monomer in the polymer is 5% to 44.5%.

18. The electrochemical apparatus according to claim 10, wherein the negative electrode comprises a negative electrode current collector and a negative electrode active substance layer, the negative electrode active substance layer comprises a negative electrode active substance, a conductive agent, and a binder; and a mass percentage of the binder in the negative electrode active substance layer is 0.5% to 8%.

* * * * *